United States Patent
Cirlig et al.

(10) Patent No.: US 10,207,186 B2
(45) Date of Patent: Feb. 19, 2019

(54) METHOD FOR CONTROLLING A USER INTERFACE

(71) Applicant: KING.COM LIMITED, St. Julians (MT)

(72) Inventors: Constantin-Gabriel Cirlig, Bucharest (RO); Teodor Catalin Gospodin, Bucharest (RO); Catalin-Stefan Saitan, Bucharest (RO)

(73) Assignee: KING.COM LTD., St. Julians (MT)

( * ) Notice: Subject to any disclaimer, the term of this patent is extended or adjusted under 35 U.S.C. 154(b) by 1118 days.

(21) Appl. No.: 14/288,834

(22) Filed: May 28, 2014

(65) Prior Publication Data
US 2015/0343311 A1 Dec. 3, 2015

(51) Int. Cl.
| | | |
|---|---|---|
| A63F 13/537 | (2014.01) | |
| A63F 13/55 | (2014.01) | |
| A63F 13/52 | (2014.01) | |
| A63F 13/42 | (2014.01) | |
| A63F 13/30 | (2014.01) | |

(52) U.S. Cl.
CPC ........... *A63F 13/537* (2014.09); *A63F 13/30* (2014.09); *A63F 13/42* (2014.09); *A63F 13/52* (2014.09); *A63F 13/55* (2014.09); *A63F 2300/308* (2013.01)

(58) Field of Classification Search
CPC .... A63F 2300/308; A63F 13/52; A63F 13/42; A63F 13/55; A63F 13/537; G06F 3/0481
USPC .......................................................... 463/31
See application file for complete search history.

(56) References Cited

U.S. PATENT DOCUMENTS

| | | | | | |
|---|---|---|---|---|---|
| 5,312,113 | A | * | 5/1994 | Ta-Hsien | A63F 13/005 463/9 |
| 5,643,085 | A | * | 7/1997 | Aityan | A63F 9/24 273/153 R |
| 6,093,104 | A | * | 7/2000 | Kasahara | A63F 13/005 463/10 |
| 6,256,040 | B1 | * | 7/2001 | Tanaka | A63F 13/10 345/421 |
| 6,458,032 | B1 | * | 10/2002 | Yamagami | A63F 13/005 273/153 R |

(Continued)

*Primary Examiner* — Michael Cuff
(74) *Attorney, Agent, or Firm* — Saul Ewing Arnstein & Lehr LLP (57) ABSTRACT

In an embodiment there is provided a computer implemented method of providing a game, the method comprising the following implemented by at least one processor and at least one memory of a device retrieving from at least one memory information associated with a plurality of first objects and one or more characteristics of said first objects and causing said objects with said one or more characteristics to be displayed on a display in an arrangement, executing at least one algorithm which: responsive to detected user input rearranges said first objects to provide a sequence of at least three adjacent first objects sharing at least one same characteristic, determines an upgrade level of each of said at least three adjacent first objects, and in response to said determination selecting one of said at least three adjacent first objects for upgrading, and causes an updated arrangement to be displayed with said selected one of the said at least three adjacent first objects being upgraded and having said same characteristic and other of said three adjacent first objects being replaced with further first objects. A device and program are also provided.

21 Claims, 11 Drawing Sheets

(56) References Cited

U.S. PATENT DOCUMENTS

| | | | | |
|---|---|---|---|---|
| 7,785,179 B2* | 8/2010 | Ionescu | ............... | A63F 3/0421 |
| | | | | 463/9 |
| 9,120,010 B2* | 9/2015 | Karn | ............... | A63F 13/00 |
| 2003/0040350 A1* | 2/2003 | Nakata | ............... | A63F 9/10 |
| | | | | 463/9 |
| 2014/0080556 A1* | 3/2014 | Knutsson | ............... | A63F 13/12 |
| | | | | 463/7 |
| 2014/0235306 A1* | 8/2014 | Walls | ............... | A63F 13/10 |
| | | | | 463/9 |
| 2015/0174489 A1* | 6/2015 | Evald | ............... | A63F 13/47 |
| | | | | 463/31 |
| 2015/0343305 A1* | 12/2015 | Cirlig | ............... | A63F 13/80 |
| | | | | 463/31 |
| 2015/0343310 A1* | 12/2015 | Cirlig | ............... | A63F 13/52 |
| | | | | 463/9 |
| 2016/0089603 A1* | 3/2016 | Frostberg | ............... | A63F 13/537 |
| | | | | 463/31 |

\* cited by examiner

METHOD FOR CONTROLLING A USER INTERFACE

FIELD OF THE INVENTION

Some embodiments relate to controlling a user interface responsive to user input with displayed objects on the interface of a device.

BACKGROUND OF THE INVENTION

There are many technical challenges and technical considerations facing the designer of computer applications such as games executed on a user or computer or other device having a user interface, such as designing algorithms for controlling the user interface.

SUMMARY OF THE INVENTION

According to an aspect there is provided a computer implemented method of providing a game, the method comprising the following implemented by at least one processor and at least one memory of a device: retrieving from at least one memory information associated with a plurality of first objects and one or more characteristics of said first objects and causing said objects with said one or more characteristics to be displayed on a display in an arrangement, executing at least one algorithm which: responsive to detected user input rearranges said first objects to provide a sequence of at least three adjacent first objects sharing at least one same characteristic, determines an upgrade level of each of said at least three adjacent first objects, and in response to said determination selecting one of said at least three adjacent first objects for upgrading, and causes an updated arrangement to be displayed with said selected one of the said at least three adjacent first objects being upgraded and having said same characteristic and other of said three adjacent first objects being replaced with further first objects.

In an embodiment the upgrade level may comprise a predetermined number of levels up to a maximum level. By way of example, there may be two levels of upgrade in an embodiment, thereby providing an object with three levels or states, with three being the maximum level in this example.

The upgrading may comprise upgrading the selected one of said at least three adjacent objects to the next available level.

In another embodiment, the determination of an upgrade level of the selected one of said at least three adjacent objects may be dependent on the number of first objects in said sequence. For example a sequence of three or four objects may cause one of said objects to be upgraded by one level, whereas a sequence of five objects or more may cause an object at level one to be promoted to the maximum level directly.

A selected object that is upgraded to the maximum level may be provided with one or more action characteristic in some embodiments. The one or more action characteristic may be indicated in association with the upgraded object when displayed.

An action characteristic may comprise attributes that cause all objects in the same row or column or diagonally with respect to the arrangement and the position of the tile or object activated to be eliminated or removed.

Other action characteristics may comprise removing adjacent tiles surrounding the upgraded activated object in a pre-defined pattern, or the action may in turn activate a bonus object when triggered by the activation.

The action characteristic may activated in dependence on the subsequent providing of said object in a sequence.

In another embodiment, an algorithm may be provided which may analyse the updated arrangement for further sequences of at least three adjacent first objects sharing at least one same characteristic, to determine an upgrade level of each of said at least three adjacent first objects, and in response to said determination selecting one of said at least three adjacent first objects for upgrading, and to cause an updated arrangement to be displayed with said selected one of the said at least three adjacent first objects being upgraded and having said same characteristic and other of said three adjacent first objects being replaced with further first objects.

Optionally, the number of further sequences which count towards a score may be dependent on a threshold.

The threshold may be dependent on one or more of the number of objects in said further sequences, the level of objects in said further sequences, the number of fully upgraded objects in said further sequences, on the type of action characteristics actioned in said sequences.

In another embodiment, there may be provided an algorithm responsive to detected user input to rearrange said first objects to provide a sequence of at least three adjacent first objects sharing at least one same characteristic, to detect an input corresponding to a first object position of said arrangement, to select an object displayed at that position, detect subsequent input in a horizontal direction or a vertical direction with respect to said arrangement, and select all objects within a column or row containing the selected object for movement in dependence on the direction of the subsequent input.

The arrangement may be rearranged by scrolling the selected row or column objects.

The arrangement may temporarily indicate at least one valid sequence during said scrolling.

According to another aspect, there is provided a device comprising at least one processor and at least one memory in connection with said at least one processor, the at least one memory storing information associated with a plurality of first objects and one or more characteristics of said first objects, the at least one processor configured to: retrieve from the memory said information associated with a plurality of first objects and one or more characteristics of said first objects and cause said objects with said one or more characteristics to be displayed on a display in an arrangement, and to execute at least one algorithm which: responsive to detected user input rearranges said first objects to provide a sequence of at least three adjacent first objects sharing at least one same characteristic, determines an upgrade level of each of said at least three adjacent first objects, and in response to said determination selecting one of said at least three adjacent first objects for upgrading, and causes an updated arrangement to be displayed with said selected one of the said at least three adjacent first objects being upgraded and having said same characteristic and other of said three adjacent first objects being replaced with further first objects.

The at least one processor may be further configured to analyse the updated arrangement for further sequences of at least three adjacent first objects sharing at least one same characteristic, to determine an upgrade level of each of said at least three adjacent first objects, and in response to said determination selecting one of said at least three adjacent first objects for upgrading, and to cause an updated arrangement to be displayed with said selected one of the said at least three adjacent first objects being upgraded and having said same characteristic and other of said three adjacent first objects being replaced with further first objects.

The at least one processor may be further configured to detect an input corresponding to a first object position of said arrangement, select an object displayed at that position, detect subsequent input in a horizontal direction or a vertical direction with respect to said arrangement, and select all objects within a column or row containing the selected object for movement in dependence on the direction of the subsequent input.

According to yet another aspect, there is provided a computer readable storage device storing instructions that, when processed by at least one processor of a device, causes said processor to retrieve from at least one memory in connection with said at least one processor information associated with a plurality of first objects and one or more characteristics of said first objects and causing said objects with said one or more characteristics to be displayed on a display in an arrangement, execute at least one algorithm which responsive to detected user input rearranges said first objects to provide a sequence of at least three adjacent first objects sharing at least one same characteristic, determines an upgrade level of each of said at least three adjacent first objects, and in response to said determination selecting one of said at least three adjacent first objects for upgrading, and causes an updated arrangement to be displayed with said selected one of the said at least three adjacent first objects being upgraded and having said same characteristic and other of said three adjacent first objects being replaced with further first objects.

These and other features are as defined by the appended claims.

BRIEF DESCRIPTION OF DRAWINGS

To understand some embodiments, reference will now be made by way of example only to the accompanying drawings, in which.

DETAILED DESCRIPTION OF THE INVENTION

The techniques described herein can be implemented in for instance a computer application which involves the matching of objects displayed on a game area or game board and the elimination of such to complete a level or aim or target score of such a game. The game may be a so-called "casual" or "social" game, wherein short periods of play are undertaken by the user whenever appropriate according to the user's schedule.

Such games are increasingly offered and played by users on a wide range of devices such as portable devices such as smart pad or tables or larger devices such as desk top computers or lap top computers.

Figure 1:
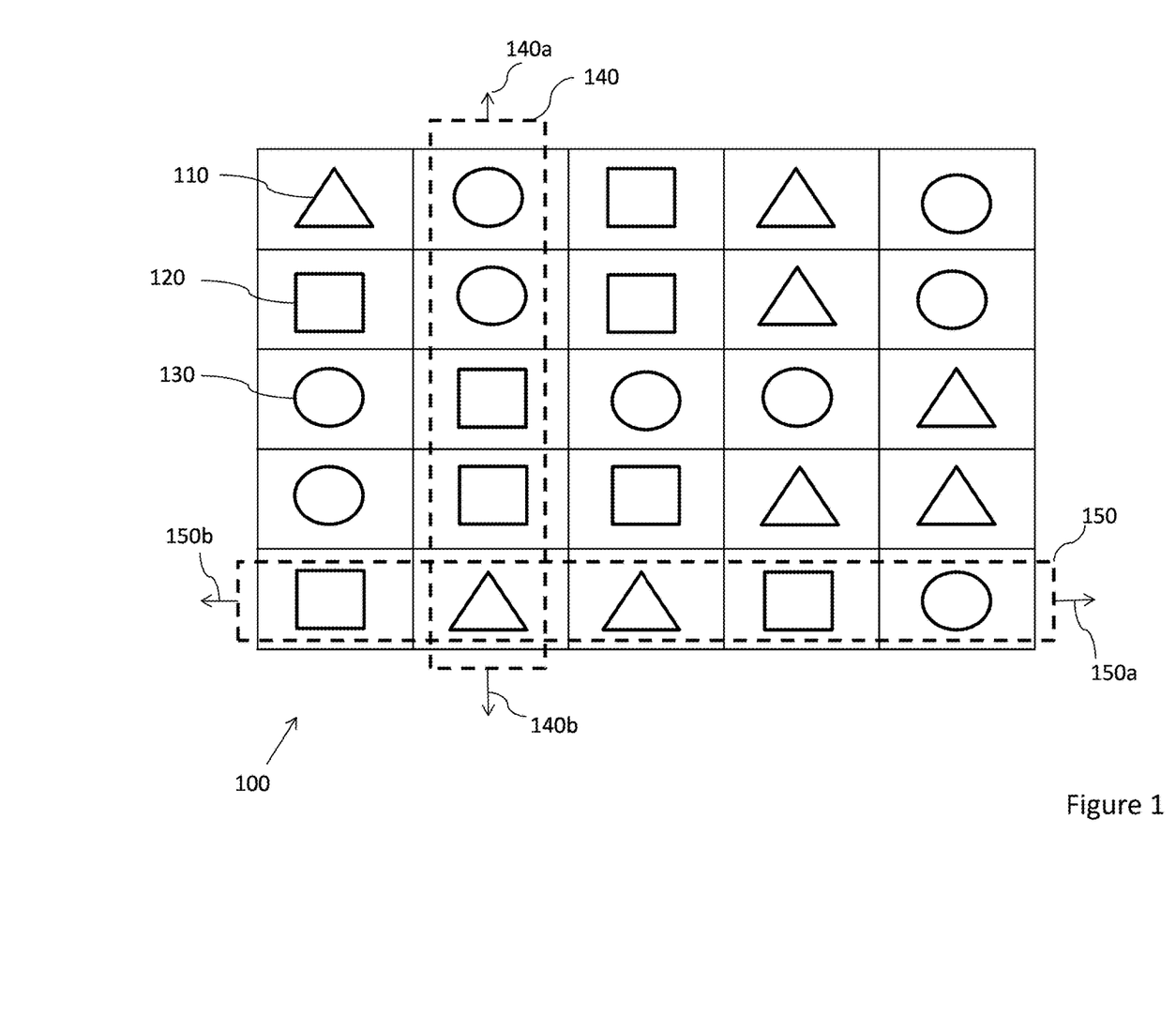
FIG. 1 shows an example embodiment of a game area or board.

FIG. 1 shows an example schematic arrangement 100 for display on a user device according to an embodiment. An algorithm is configured to control the device such that an arrangement such as shown in FIG. 1 is displayed. The arrangement comprises a displayed game area 100 having first objects (also referred to as tiles) 110, 120, 130. Each tile has one or more attributes. Each attribute may have one or more possible values. These objects are game elements or tiles. The attributes may comprise colour, shape, and/or different types of objects with associated value. The first objects may have other characteristics defining graphical representations and shapes, and may represent different types of similar objects when displayed on the game area 100.

First objects 110, 120, 130 may be removed from the game board 100 by user input sliding a row or column of first game objects 120 to create a sequence. The sequence may require three or more first game objects having at least one attribute having the same value to be aligned adjacent one another in a row or column of said game area 100.

The game may, in one embodiment, end if the player or user runs out of time or moves before managing to reach a designated target such as a score or moves (not shown in FIG. 1).

Those skilled in the art will appreciate that the arrangement of other grid sizes or patterns may be suitable.

The first objects 110, 120, 130 displayed on the arrangement 100 may have four (or any other suitable number of) contact points with other neighbouring or adjacent first objects.

Other game board layouts or configurations may be provided. For example, pyramidal, hexagonal, octagonal or other layouts comprising position spaces or tiles within the game board 100 may be provided for display.

The number of differing colours may for example be three or more colours.

Figure 2:
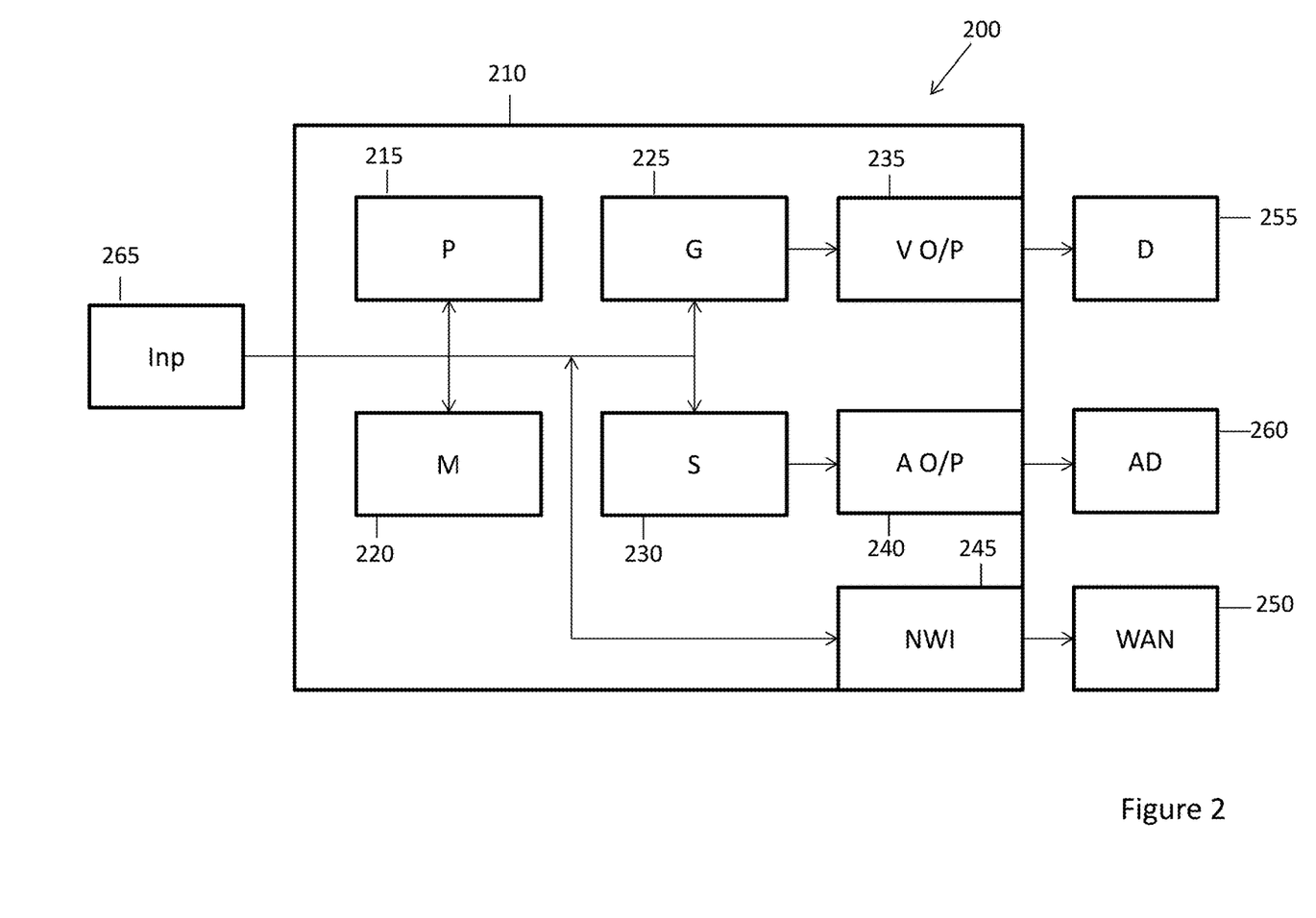
FIG. 2 shows an example user device in which some embodiments may be provided.

A schematic view of a user or computing device 200 according to an embodiment is shown in FIG. 2. All of the blocks shown are implemented by suitable circuitry and/or may be software modules. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other by an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
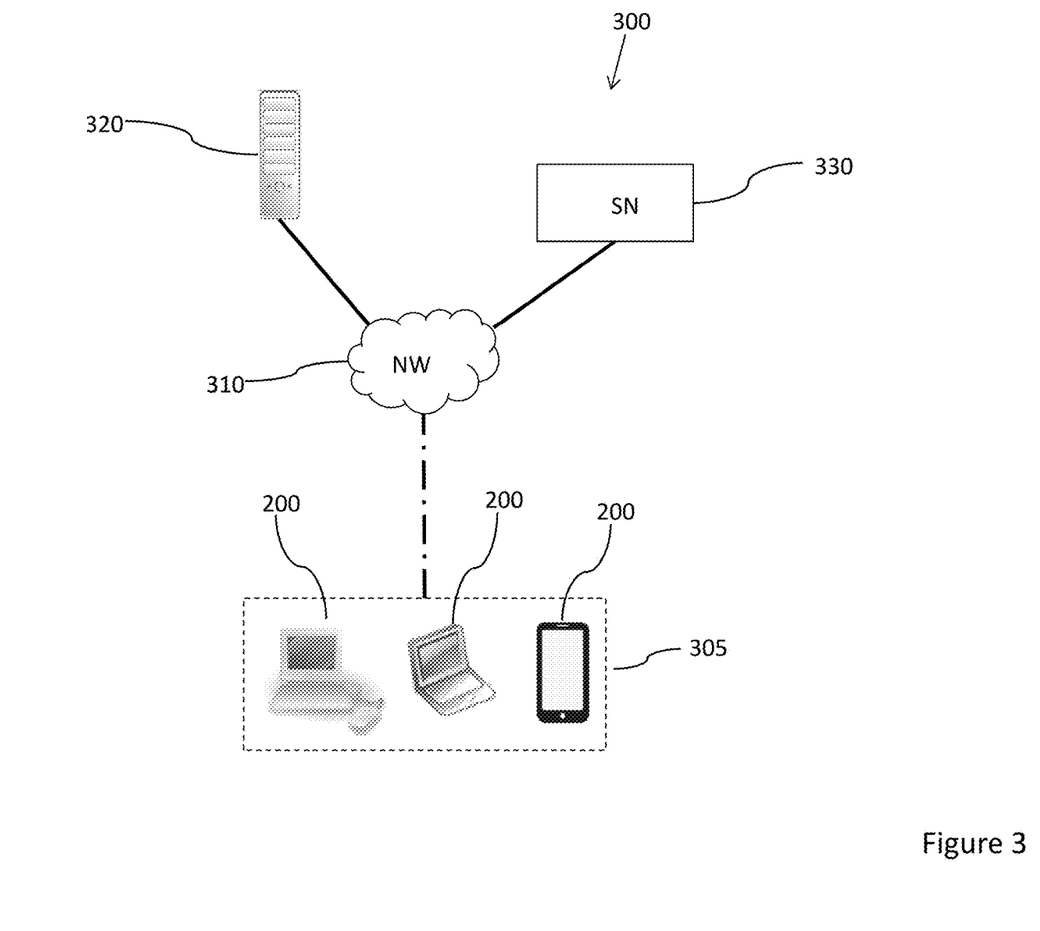
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other players 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

The device and systems of FIGS. 2 and 3 may execute algorithms for selection, validation, rearrangement and upgrade as will now be described with reference to FIGS. 4 through 10.

Figure 4A:
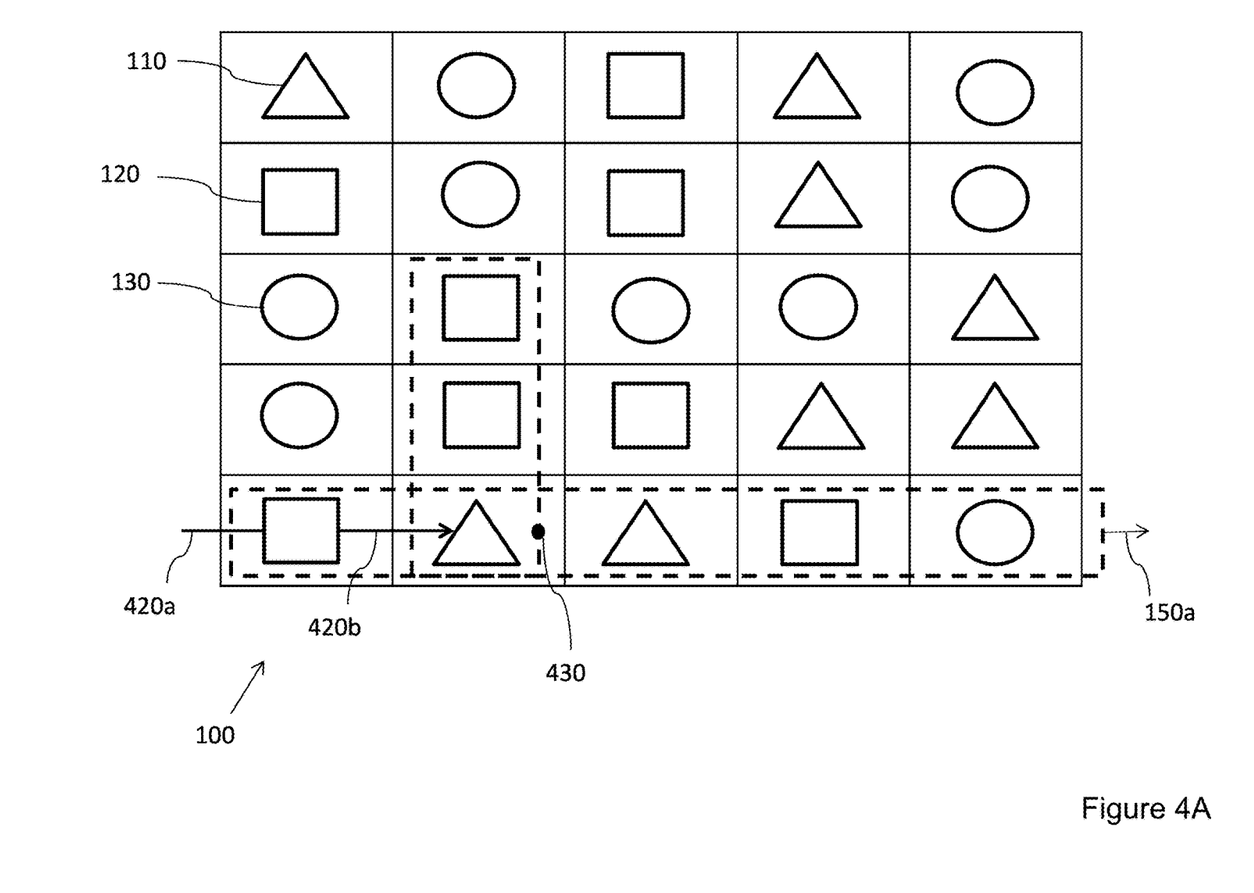
FIGS. 4A, 4B and 4C illustrate example selection mechanics according to some embodiments.

FIG. 4A shows the game area and arrangement of FIG. 1. Input via the user input is detected at a position corresponding to object 420a to select the object 420a. The selection of the object may be by the user moving a cursor using a pointer device such as a mouse, a touch pad or the like. Alternatively the selection of the object may be detected by detecting a user's finger or the like at a location of a touchscreen at the position of the displayed object.

A subsequent slide input is detected indicating that the user wishes to slide the row in which object 420a is located in the direction of arrow 420b as shown. In doing so, a rearrangement algorithm may be invoked by processor 215 if the movement creates a matching sequence of three or more first objects as shown by region 430 and the end of input is detected.

Figure 4B:
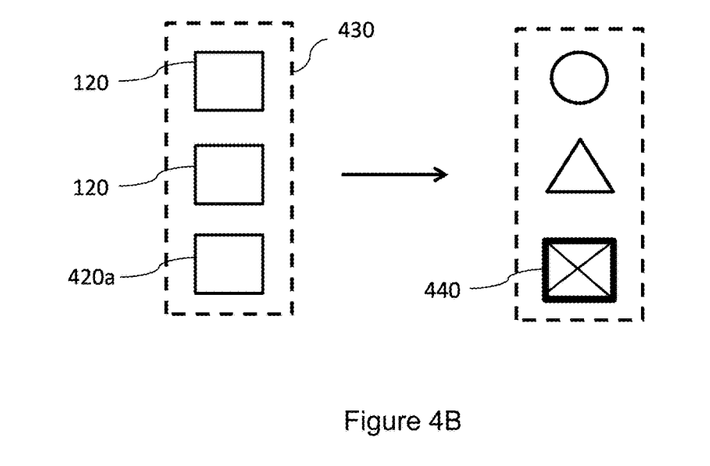

FIG. 4B illustrates the region 430 creating a match since at least three objects 120 and 420a sharing at least one same characteristic are aligned adjacent each other after the input.

A match may comprise three or more objects sharing at least one same characteristic being repositioned to be adjacent each other in a column if the input movement is in a horizontal direction with respect to the arrangement 100 or the three or more objects may be adjacent each other in a row if the input movement is in a vertical direction with respect to the arrangement 100.

Such a detected match causes the processor 215 to execute a rearrangement and update object algorithm. This is shown pictorially on the right side of FIG. 4B wherein objects 120 of selected match area 430 have been replaced by objects 130, 110. In particular object 420a has been upgraded to object 440 having at least one different characteristic to the previously matched first object characteristics, whilst still sharing at least one same characteristic.

FIG. 4B indicates this by way of example by depicting object 440 as a larger square shaped object 440 with an indication (here simply shown as crosshatching) that the object has been upgraded from a first level to a second level. The upgrade and rearrangement algorithm will be described in more detail with regard to FIGS. 7 to 9 shortly.

Figure 4C:
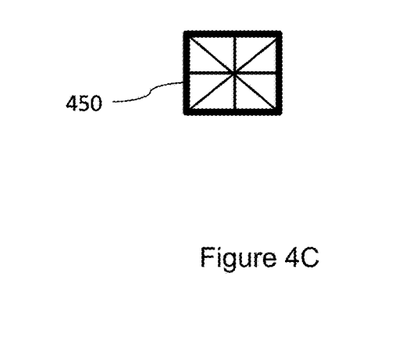

FIG. 4C indicates a further level upgrade following a subsequent match of three adjacent objects including object 440, wherein already updated object 440 has been replaced by a further upgraded object 450.

Figure 5:
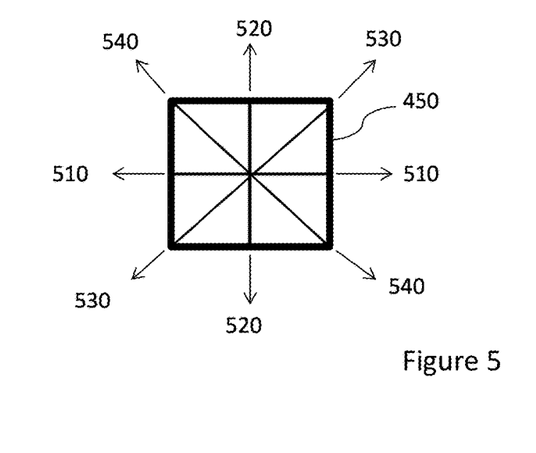
FIG. 5 illustrates an example object and action characteristics according to some embodiments.

FIG. 5 illustrates pictorially object 450 after upgrade with an indication of at least one associated action characteristic 510, 520, 530, 540. For example, selection of the further upgraded object 450 in a subsequent match may activate one or more of the action characteristics of the object 450 to remove and replace all objects along a row 510, column 520 or those occupying positions that are in diagonal 530, 540 from the position of the activated object 450.

In some embodiments, the number of different upgrade levels available may be two or more. In some games, the number of upgrade levels may be three. When the object has been upgraded the maximum number of times, the upgraded object, when in a match will provide an action which removes tiles in addition to the tiles being matched. For example, the action may be line blasters or bomb type effects.

The action provided may be selected at random. In some embodiments, only one type of action is provided in a game. In some embodiments, the action provided may be associated with a value of an attribute of the object. The value of the attribute may the same attribute which is used when matching. The attribute may be colour or any other suitable attribute.

Other action characteristics may be provided in memory 220, and may be selected randomly to apply to an upgraded object.

Other action characteristics may comprise increasing the score or value associated with the object 440, 450, activating second or other objects within the game area 100, or acting as a localised bomb by destroying all adjacent objects surrounding the activated further upgraded object 450.

In one embodiment, a second object may be provided in connection with the arrangement 100. The second object may have a characteristic that is triggered only in dependence on the activation of a fully upgraded further game object action characteristic. The characteristic may comprise a reward. The reward may comprise an extra score in some embodiments, or may comprise upgrading of objects on the game arrangement.

In an embodiment, the second object may be represented as a balloon. The second object may have in built movement so that it is only triggered when it coincides with a row or column containing the upgraded further object which is activated.

Other attributes may be applied to the second object.

The algorithms and mechanisms for providing the touch input, match detection and selection, and upgrading and replacing objects will now be described.

Figure 6:
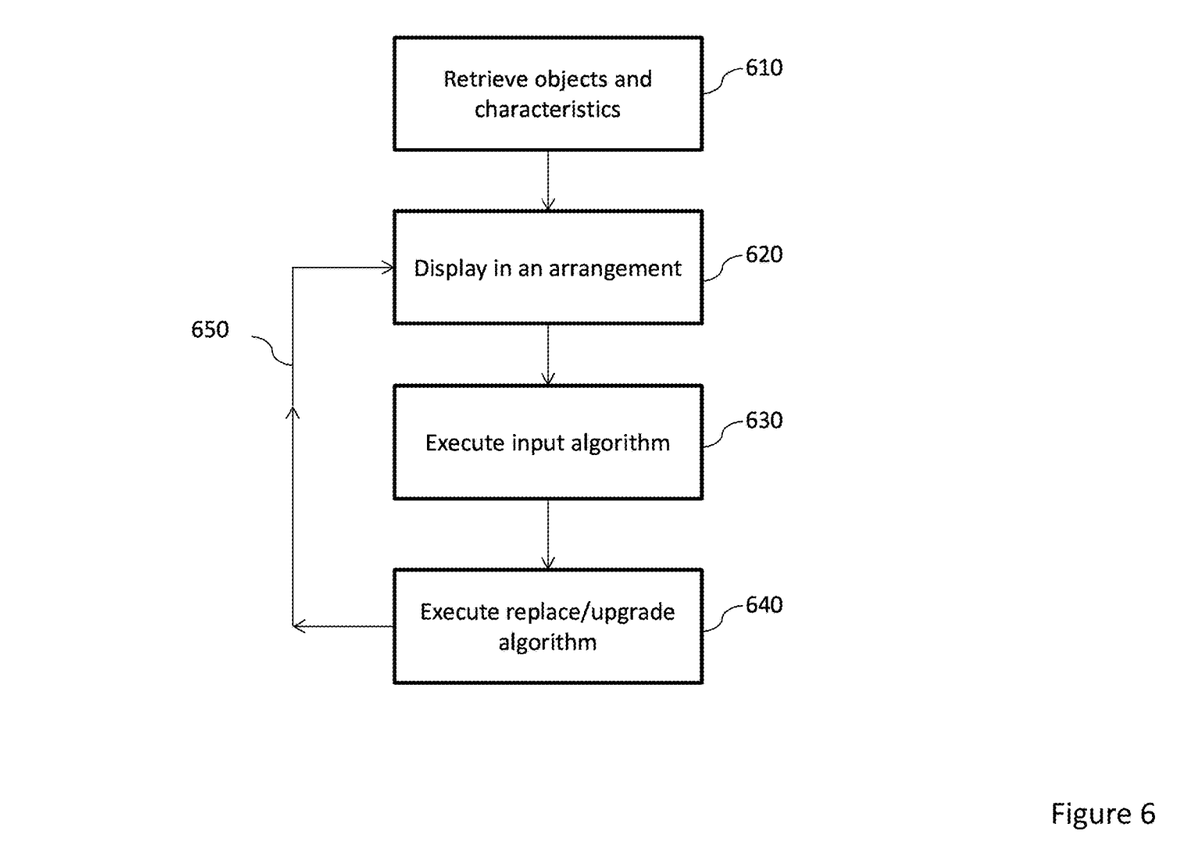
FIG. 6 is a flowchart depicting steps of a method according to an embodiment.

FIG. 6 is a flowchart describing steps taken by the processor 215, 320. At step 610, processor 215, 320 in conjunction with at least one memory causes the first objects and associated characteristics to be rendered. The objects are then displayed in an arrangement, as described for example with reference to FIG. 1 at step 620. The processor subsequently at step 630 executes an input algorithm which will be described in more detail with respect to FIG. 7. In dependence on the outcome of the algorithm the processor may then execute a replace and upgrade algorithm at step 640, and flow may then return via path 650 to step 620.

Figure 7:
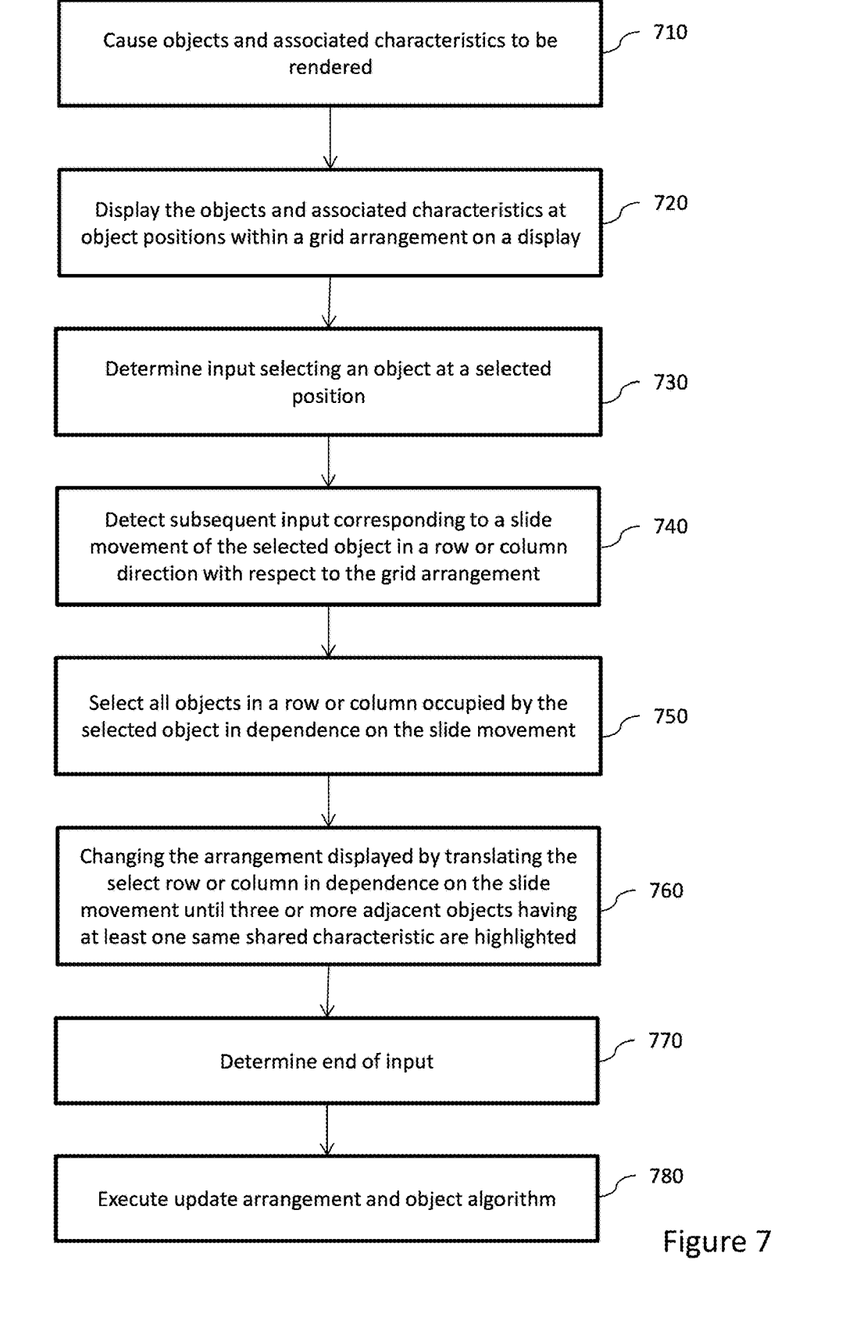
FIG. 7 is a flowchart depicting steps of an input selection algorithm according to an embodiment.

FIG. 7 describes in more detail steps of an embodiment of the input algorithm 630.

At step 710, processor 215 in conjunction with the memory causes the objects 110, 120, 130 and their associated characteristics to be rendered for view and displays the objects 110, 120, 130 having their associated characteristics at object positions within a grid arrangement on display 255 at step 720.

The processor in conjunction with the memory then at step 730 detects input by the user. The input may be provided by the operation of a pointer device such as a mouse or touchpad or by a user touching the display if the display is a touch screen. The processor is configured to determine a user selected position and selects the object 420a at that position.

Subsequently, at step 740 the processor 215 in conjunction with the memory detects subsequent input 420b corresponding to a slide or scroll movement of the selected object in a row or column direction with respect to the grid arrangement as illustrated pictorially in FIG. 4.

At step 750 the processor 215 selects all objects in the row or column occupied by the selected object in dependence on the detected direction of the slide or scroll movement. For example processor 215 may detect a slide movement in a horizontal direction and therefore selects all objects in the row containing the selected object for movement. Conversely, a determination of vertical slide movement causes all objects in the column to be selected for movement. The information stored about the objects may be updated to reflect the movement of the row or column At step 760, the displayed arrangement is updated to show the translating of the selected row or column including the objects within that row or column in dependence on the determined movement direction. The algorithm is configured to check if three or more adjacent objects having at least one same shared characteristics are provided in the game arrangement. This may be to determine a valid input or move. In some embodiments, if three or more adjacent objects having a least one same shared characteristic are not found, the move may be determined to be invalid and the information about the game objects may be returned to the state prior to the user inputting a move.

The three or more adjacent objects having at least one same characteristic (thereby forming a "match") may be highlighted on the display in some embodiments to provide feedback to the user to indicate valid movement and input. The highlighting is controlled by the algorithm.

At step 770 the processor 215 determines the end of input and, in dependence on the analysis of the arrangement for three or more matching adjacent first objects, executes an update object and arrangement algorithm at step 780.

Figure 8:
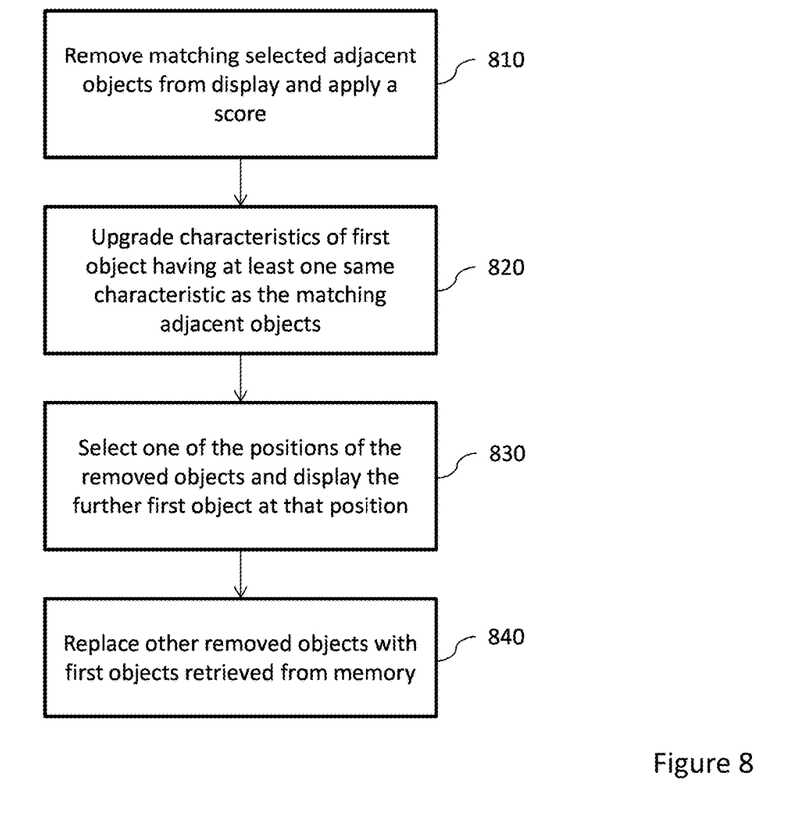
FIG. 8 is a flowchart depicting steps of a rearrangement and display algorithm according to an embodiment.

FIG. 8 is an embodiment showing steps of an algorithm which may be carried out in dependence on the outcome of the algorithm previously described with respect to FIG. 7.

At step 810 the algorithm may cause the removal of matching selected adjacent objects from the display and from the information stored relating to the arrangement. The algorithm may apply a score. The algorithm may determine the matched objects and associated characteristics including their value and a score may be applied in accordance with the combined value. In some embodiments, the score may be simply determined depending on the number of tiles removed. In some embodiments, the score may be dependent on characteristics or attributes of the removed game objects. In some embodiments, as will be described later, the algorithm may cause game objects in addition to the matching game objects to be removed. These additional game objects may be taken into account when determining the score.

At step 820, in order to replace the matching selected adjacent objects the algorithm is configured to replace one of the objects with a further first object 440, 450 with an upgraded different characteristic and at least one same characteristic as the matching adjacent objects. By way of example only, the colour of the upgraded object may be the same as the matching objects and the size of the upgraded object may be larger than the matching objects.

Process then flows to step 830 where the algorithm is configured to cause the further first object 440, 450 to be displayed at a given position on the arrangement. The position may be one of the positions of the matching objects. The position may be selected at random or the position may be selected always to be an end position or a middle position or may followed a defined pattern. The remaining other first objects of the selection are each subsequently replaced at step 840 wherein the processor 215 replaces each of the removed objects with a first object and associated characteristics retrieved from memory.

Figure 9:
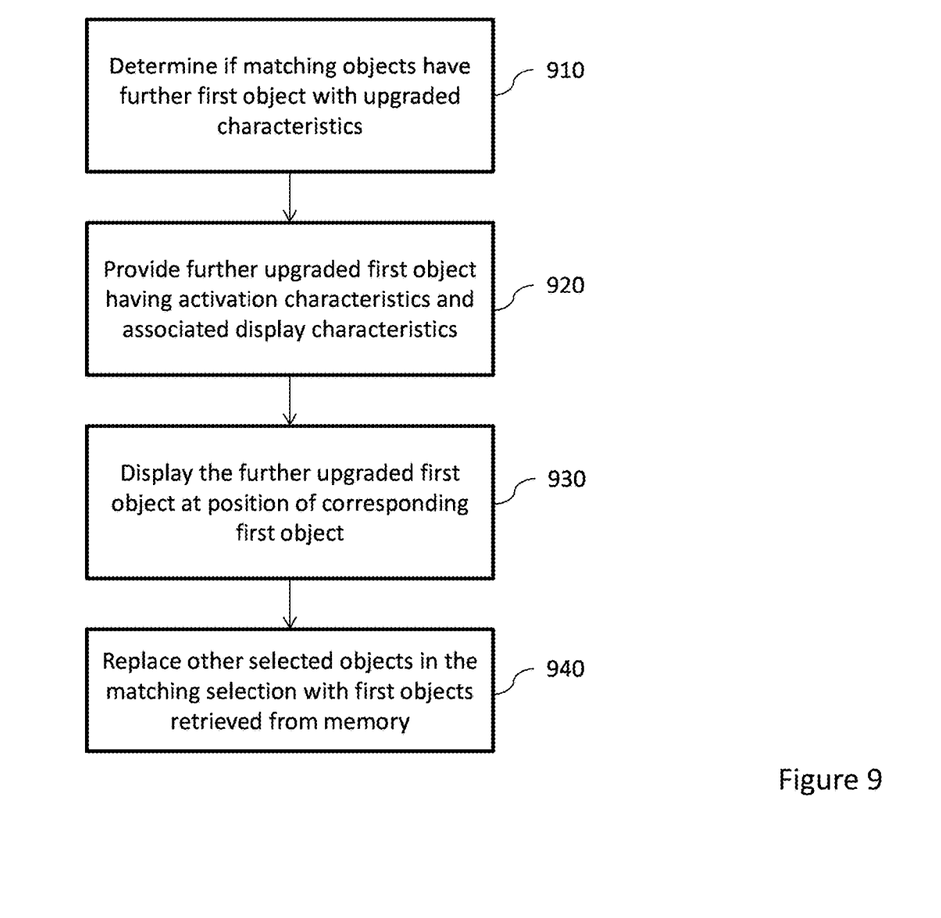
FIG. 9 is a flowchart depicting steps of another rearrangement and display algorithm according to an embodiment.

FIG. 9 shows an embodiment of steps of a method comprising further selection and upgrade of an already upgraded object. Hence selection and subsequent selection of objects may provide upgraded objects, which have for instance increased score characteristics and are larger as a different characteristic. The objects at this next level of upgrade may also have activation characteristics with associated display characteristics as described with reference to FIGS. 4C and 5.

At step 910 the algorithm is configured to analyze the current input selection to determine whether the matching object selection of three or more adjacent objects includes a further first object. If so, the process flows to step 920 where the algorithm is configured to provide a further upgraded first object having associated display characteristics. The algorithm is configured to determine which if any of the matching objects has been upgraded and if so which has been upgraded the most. The algorithm is configured to select the matching object which has been upgraded the most as the object which is further upgraded.

At step 930, the algorithm will cause the further upgraded first object to be displayed at the position of the object which was upgraded. The further upgraded object may have at least one activation characteristic, such as for example those described with reference to FIG. 5. If more than one matching object has been upgraded to a level, then one of those already upgraded objects is selected for further upgrade.

At step 940 the algorithm causes the other objects in the matching selection which are not upgraded objects to be replaced with first objects.

In some embodiments, the number of matching objects is determined by the algorithm and the action taken may be dependent on the number of objects which are matched. In some embodiments, if the number of matching objects is greater than a certain threshold, one of the matching objects may be upgraded by a plurality of levels, for example to the highest level. Otherwise, the steps as previously described may be performed. By way of example only, the threshold may be five matching objects.

In some embodiments, the algorithm will determine if any of the matching objects have been upgraded to the highest level. If so the algorithm will cause game elements to be removed from the arrangement in dependence on the action associated with the matching object having the highest level. This may cause the game objects in row or column to be removed or may cause the game objects around the matching object having the highest level to be removed. In some embodiments one or more action may cause another game element to change its graphical representation before being removed.

Thus some embodiments comprise an algorithm configured such as to make a determination as to whether or not the user input represents a valid input resulting in a match of at least three objects. The algorithm is such that the number of first objects which match is determined and the action which is taken is dependent on the number of first objects which match. Below the threshold number of matches but with three or more matches, the algorithm is configured to determine the upgrade level of each first object in the match. If the algorithm determines that at least one object has reached the maximum upgrade level, then the associated action is applied. If not the algorithm is configured to determine the highest upgrade level (if present) and apply a further upgrade to the first object having that highest upgrade level. The algorithm may have to select which first object to upgrade if there is more than one first object having the same upgrade level (which may be none).

The algorithm may determine the matched objects and associated characteristics including their value and a score may be applied in accordance with the combined value. In some embodiments, the score may be simply determined depending on the number of tiles removed. In some embodiments, the score may be dependent on characteristics or attributes of the removed game objects.

In some embodiments, as will now be described with reference to FIGS. 10A, 10B and 10C, the algorithm may cause game objects in addition to the matching game objects to be removed. These additional game objects may be taken into account when determining a score.

Figure 10A:
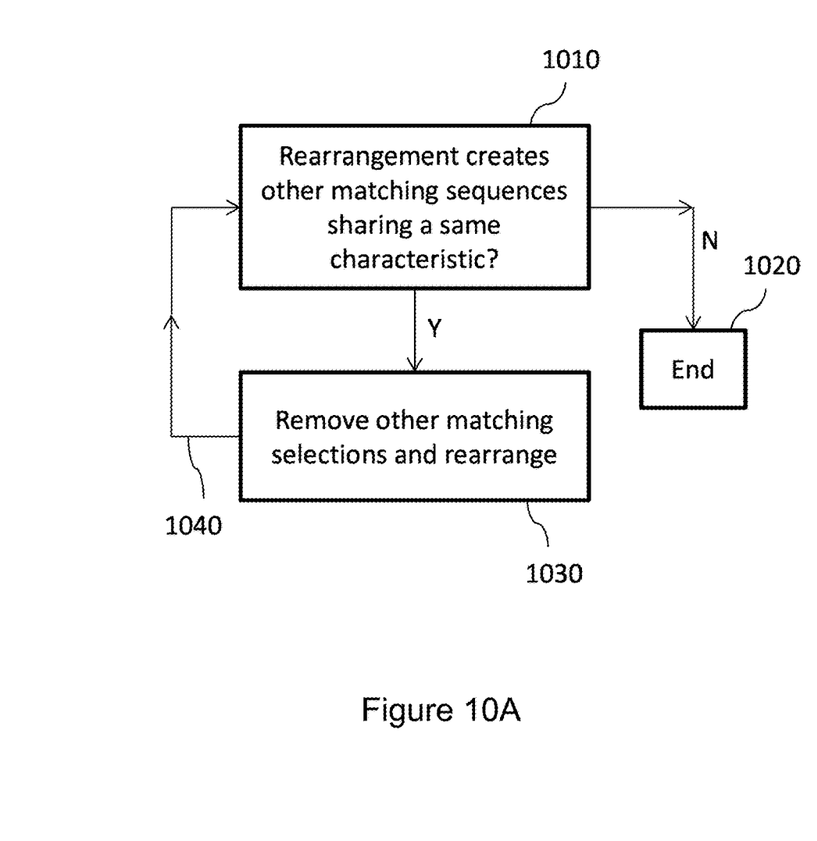
FIGS. 10A, 10B and 10C are flowcharts depicting algorithmic steps according to some embodiments.

FIG. 10A is a flowchart showing steps in an algorithm following a valid input.

At step 1010 the algorithm causes said processor in conjunction with memory to analyze the new game arrangement and information to determine whether the replacement or upgrade of first objects will generate other matching sequences of three or more first objects sharing at least one same characteristic in the arrangement. If not, then the process ends as indicated at step 1020.

However, if the analysis indicates that the new game arrangement and information will generate further matching sequences of three or more first objects sharing at least one same characteristic then these sequences are rendered for display and subsequently removed at step 1030, and the algorithm upgrades one of the matching objects by one level to a further object and replaces the remaining matched objects of the sequence with first objects. The upgrade may be performed as previously described with reference to FIG. 8.

The algorithm may then cause further analysis of the new rearrangement and information by returning via path 1040 to step 1010.

This can lead to a cascade of matching sequences in addition to the sequence validated upon the original input. Such sequences may be included in the eventual score returned for that input.

Figure 10B:
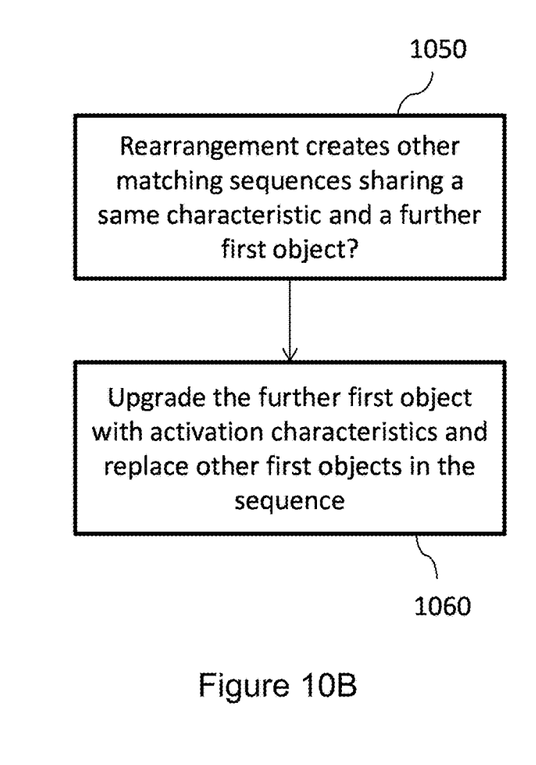

FIG. 10B illustrates a flowchart showing steps that may be taken following, or during the execution by the processor in conjunction with the memory when executing the algorithm to rearrange the arrangement including the removal and replacement of three or more objects sharing at least one same characteristic or attribute.

The processor 215 in conjunction with memory 220, at step 1050 analyses the new game arrangement and information and further checks whether the replacement will generate other matching sequences of three or more first objects sharing at least one same characteristic, and whether one of the objects in at least one of the other sequences is a further object 440.

If so, then processor 215 in conjunction with memory 220 renders the replacement objects for display and automatically subsequently removes those matching objects at step 1060, and upgrades one of the matching objects to a further object and retrieves from memory an associated activation characteristic and renders the object at a position and replaces the remaining matching first objects. The upgrade may be performed as previously described with reference to FIG. 9.

FIG. 10O illustrates a flowchart showing steps that may be taken following, or during the execution by the processor in conjunction with the memory when executing the algorithm to rearrange the arrangement including the removal and replacement of three or more objects sharing at least one same characteristic or attribute.

The processor 215 in conjunction with memory 220, at step 1010 analyses the new game arrangement and information and further checks whether the replacement will generate other matching sequences of three or more first objects sharing at least one same characteristic, and whether one of the objects in at least one of the other sequences is a further object 450 with associated activation characteristics.

If so, then processor 215 in conjunction with memory 220 renders the replacement objects for display and automatically activates the characteristic of the upgraded further object in the sequence.

Figure 10C:
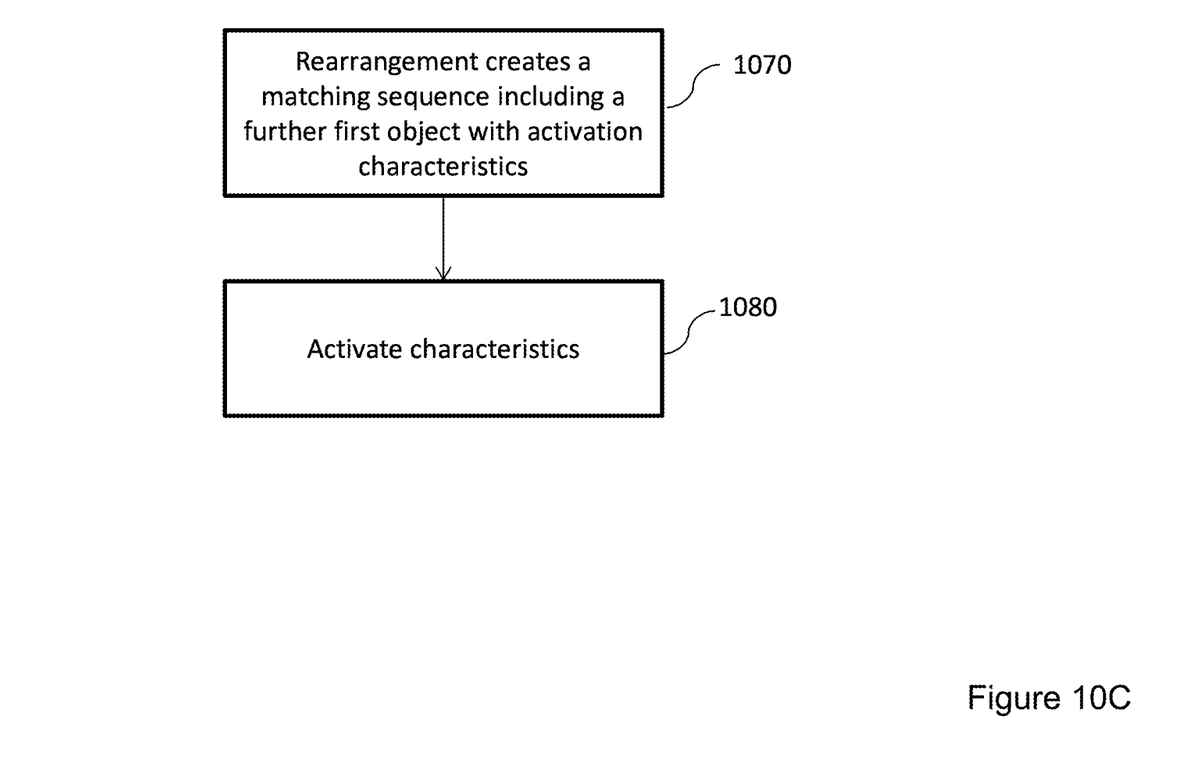

The analysis of the arrangement as per FIGS. 10A, 10B, and 10C may occur concurrently on each re-arrangement.

The replacement objects may be rendered to cascade or refill the game arrangement before removal, to indicate automatically an effect to the user on the display. Other rendering effects may be implemented to indicate the automatic refill, removal and upgrade effect.

Hence algorithms are provided which cause an automatic cascading effect of analysis, replacement, upgrade and re-arrangement after a validated input.

However, a problem with such cascading sequences was realized in that large scores could be obtained which may surpass an initial target score for example, or may not be appropriate for skill based tournament play.

Therefore, a threshold in some embodiments may be applied to the score per sequence matched per input so as to limit or cap the score per turn and avoid the score increasing or multiplying exponentially.

In another embodiment, the threshold may comprise the number of matching sequences per input which are counted to determine the score may be limited. The threshold may depend on the attributes of the matching objects per sequence.

For example, a first threshold may be provided for the number of sequences in a cascade having three first objects, and a second or different threshold may be provided for scoring sequences including first level upgraded objects. Another threshold may apply to the number of sequences matched in the cascade having second level upgraded objects and the scores created from the automatic activation of their action characteristic.

The thresholds and limits may depend on the game application, the arrangement, and the attributes of the objects which cause the processor to determine the score in order to balance the score.

Alternatively, or in addition the scoring may increase per sequence by a multiplier sequence, so that for example each additional sequence provides double the score of the previous. In such examples, a threshold or limit to the score is applied to avoid excessive scoring per input.

Several of the Figures have shown various algorithms. It should be appreciated that in some embodiments, more than one of these algorithms may be part of the same algorithm.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes embodiments of the invention, there are several variations and modifications which may be made to the disclosed solution without departing from the scope of the present invention.

The invention claimed is:

1. A computer implemented method of providing a computer-implemented game, the method comprising the following implemented by a device comprising at least one processor, at least one memory, and a user interface:
   retrieving by the at least one processor from the at least one memory, information associated with a plurality of first game objects and one or more characteristics of said first game objects and causing said first game objects with said one or more characteristics to be displayed on said user interface in an arrangement,
   receiving input from a user via the user interface to select and move one or more of said first game objects to thereby rearrange said first game objects displayed on the user interface to provide a sequence of at least three adjacent first game objects sharing at least one same characteristic,
   determining by the at least one processor an upgrade level of each of said at least three adjacent first game objects, and in response to said determination selecting by said at least one processor one of said at least three adjacent first game objects for upgrading, and
   causing by said at least one processor an updated arrangement to be displayed on said user interface with said selected one of the said at least three adjacent first game objects being upgraded and having said same characteristic and other of said three adjacent first game objects being replaced with further first game objects, whereby said upgraded first game object is displayed on said user interface such that said upgraded first game object is subsequently selectable by the user via the user interface.

2. A method according to claim 1, wherein the upgrade level comprises a predetermined number of levels up to a maximum level.

3. A method according to claim 1, comprises upgrading the selected one of said at least three adjacent game objects to the next level.

4. A method according to claim 1, comprising determining an upgrade level of the selected one of said at least three adjacent game objects dependent on the number of first game objects in said sequence.

5. A method according to claim 2, wherein a selected first game object upgraded to the maximum level is provided with an action characteristic.

6. A method according to claim 5, wherein the action characteristic is indicated in association with the upgraded first game object when displayed.

7. A method according to claim 5, wherein the at least one action characteristic comprises one or more of line blaster, diagonal blaster, cross-bomb, 9 tiles square bomb, activate a bonus object.

8. A method according to claim 5, wherein the action characteristic is activated in dependence on the subsequent providing of said first game object in a sequence.

9. A method according to claim 1, wherein the algorithm is further configured to:
   analyse the updated arrangement for further sequences of at least three adjacent first game objects sharing at least one same characteristic,
   to determine an upgrade level of each of said at least three adjacent first game objects, and in response to said determination selecting one of said at least three adjacent first game objects for upgrading, and
   to cause an updated arrangement to be displayed with said selected one of the said at least three adjacent first game objects being upgraded and having said same characteristic and other of said three adjacent first objects being replaced with further first game objects.

10. A method according to claim 9, wherein the number of further sequences which count towards a score is dependent on a threshold.

11. A method according to claim 10, wherein the threshold is dependent on the number of first game objects in said further sequences.

12. A method according to claim 10, wherein the threshold is dependent on the level of first game objects in said further sequences.

13. A method according to claim 12, wherein the threshold is further dependent on the number of fully upgraded first game objects in said further sequences.

14. A method according to claim 13, wherein the threshold is dependent on the type of action characteristics actioned in said sequences.

15. A method according to claim 1, wherein at least one algorithm responsive to detected user input to rearrange said first game objects to provide a sequence of at least three adjacent first game objects sharing at least one same characteristic, comprises:
- detecting user input corresponding to a first game object position of said arrangement, selecting a first game object displayed at that position,
- detecting subsequent user input in a horizontal direction or a vertical direction with respect to said arrangement, and
- selecting all first game objects within a column or row containing the selected first game object for movement in dependence on the direction of the subsequent user input.

16. A method according to claim 15, wherein the arrangement is rearranged by scrolling the selected row or column objects.

17. A method according to claim 16, further comprising temporarily indicating at least one valid sequence during said scrolling.

18. A device comprising at least one processor and at least one memory in connection with said at least one processor, the at least one memory storing information associated with a plurality of first objects and one or more characteristics of said first objects, the at least one processor configured to:
- retrieve from the memory said information associated with a plurality of first game objects and one or more characteristics of said first game objects and cause said first game objects with said one or more characteristics to be displayed on a user interface in an arrangement, and to
- execute on the at least one processor at least one algorithm which:
  - responsive to detected user input, selects and moves one or more of said first game objects to thereby rearrange said first game objects displayed on the user interface to provide a sequence of at least three adjacent first game objects sharing at least one same characteristic,
  - determines an upgrade level of each of said at least three adjacent first game objects, and in response to said determination selecting one of said at least three adjacent first game objects for upgrading, and
  - causes an updated arrangement to be displayed on said user interface with said selected one of the said at least three adjacent first game objects being upgraded and having said same characteristic and other of said three adjacent first objects being replaced with further first game objects, whereby said upgraded first game object is displayed on said user interface such that said upgraded first game object is subsequently selectable by the user via the user interface.

19. A device according to claim 18, wherein the at least one processor is further configured to:
- analyse the updated arrangement for further sequences of at least three adjacent first game objects sharing at least one same characteristic,
- to determine an upgrade level of each of said at least three adjacent first game objects, and in response to said determination selecting one of said at least three adjacent first game objects for upgrading, and
- to cause an updated arrangement to be displayed with said selected one of the said at least three adjacent first game objects being upgraded and having said same characteristic and other of said three adjacent first game objects being replaced with further first objects.

20. A device according to claim 18 wherein the at least one processor is further configured to:
- detect user input corresponding to a first game object position of said arrangement,
- select a first game object displayed at that position,
- detect subsequent user input in a horizontal direction or a vertical direction with respect to said arrangement, and
- select all first game objects within a column or row containing the selected first game object for movement in dependence on the direction of the subsequent user input.

21. A computer readable storage device storing instructions that, when processed by at least one processor of a device, causes said processor to:
- retrieve from at least one memory in connection with said at least one processor information associated with a plurality of first game objects and one or more characteristics of said first game objects and causing said first game objects with said one or more characteristics to be displayed on a user interface in an arrangement,
- execute on at least one processor at least one algorithm which:
- responsive to detected user input selects and moves one or more of said first game objects to thereby rearrange said first game objects displayed on the user interface to provide a sequence of at least three adjacent first game objects sharing at least one same characteristic,
- determines an upgrade level of each of said at least three adjacent first game objects, and in response to said determination selecting one of said at least three adjacent first game objects for upgrading, and
- causes an updated arrangement to be displayed with said selected one of the said at least three adjacent first game objects being upgraded and having said same characteristic and other of said three adjacent first game objects being replaced with further first game objects, whereby said upgraded first game object is displayed on said user interface such that said upgraded first game object is subsequently selectable by the user via the user interface.

* * * * *